US007429154B2

(12) United States Patent
Kleine et al.

(10) Patent No.: US 7,429,154 B2
(45) Date of Patent: Sep. 30, 2008

(54) INSERTION END FOR A ROTARY AND A PERCUSSIVE TOOL

(75) Inventors: Werner Kleine, Achim (DE); Werner Britten, Saarbruecken (DE)

(73) Assignee: Hilti Aktiengesellschaft, Schaan (LI)

( * ) Notice: Subject to any disclaimer, the term of this patent is extended or adjusted under 35 U.S.C. 154(b) by 593 days.

(21) Appl. No.: 11/002,171

(22) Filed: Dec. 2, 2004

(65) Prior Publication Data

US 2005/0141972 A1 Jun. 30, 2005

(30) Foreign Application Priority Data

Dec. 5, 2003 (DE) ................................ 103 57 380

(51) Int. Cl.
*B23B 51/02* (2006.01)

(52) U.S. Cl. ...................................... 408/226; 175/320

(58) Field of Classification Search ....... 279/19.3–19.6; 408/226, 240; 175/320, 395; *B25D 17/08*
See application file for complete search history.

(56) References Cited

U.S. PATENT DOCUMENTS

| | | | | |
|---|---|---|---|---|
| 4,107,949 | A | 8/1978 | Wanner et al. | |
| 4,655,651 | A | 4/1987 | Hunger et al. | |
| 5,028,057 | A | 7/1991 | Wanner | |
| 5,076,371 | A * | 12/1991 | Obermeier et al. | 173/104 |
| 5,324,145 | A * | 6/1994 | Kleine | 408/226 |
| 5,397,203 | A * | 3/1995 | Kleine et al. | 408/226 |
| 5,421,682 | A * | 6/1995 | Obermeier et al. | 408/226 |
| 5,427,481 | A * | 6/1995 | Selb et al. | 408/226 |
| 5,558,478 | A * | 9/1996 | Odendahl et al. | 408/226 |
| 6,089,798 | A * | 7/2000 | Wierspecker et al. | 408/226 |
| 6,174,112 | B1 * | 1/2001 | Kleine et al. | 408/226 |
| 6,651,990 | B2 * | 11/2003 | Higasi et al. | 279/19.4 |

FOREIGN PATENT DOCUMENTS

| | | | |
|---|---|---|---|
| DE | 2551125 | A1 | 5/1977 |
| DE | 3716915 | A1 | 12/1988 |
| DE | 3941646 | A1 * | 6/1991 |
| DE | 4307050 | A1 * | 9/1993 |
| DE | 4222744 | A1 * | 1/1994 |
| DE | 4227949 | A1 * | 2/1994 |
| DE | 4303545 | | 8/1994 |
| DE | 4338818 | | 5/1995 |
| GB | 2096045 | A * | 10/1982 |
| SU | 1747260 | A1 * | 7/1992 |
| WO | 9608343 | | 3/1996 |
| WO | 9928093 | | 6/1999 |

OTHER PUBLICATIONS

Search Report, From EPO, dated Nov. 10, 2005.

* cited by examiner

*Primary Examiner*—Daniel W Howell
(74) *Attorney, Agent, or Firm*—Abelman, Frayne & Schwab

(57) ABSTRACT

An insertion end of a tool is driven along an axis at least partially rotary or percussively, which extends along the axis within a maximum guide diameter. At least one longitudinally closed locking groove and rotary driving groove is longitudinally closed at a longitudinal locking end towards the free leading end. The rotary driving groove has a groove width with at least one tangential force contact surface. At least two rotary driving grooves have a length of at least three times that of the guide diameter are arranged on the tool-side ahead of the longitudinal locking end, and have a contact length at least 1.5 times the guide diameter configured to be one fifth of the guide diameter.

12 Claims, 3 Drawing Sheets

INSERTION END FOR A ROTARY AND A PERCUSSIVE TOOL

BACKGROUND OF THE INVENTION

Figure 1A:
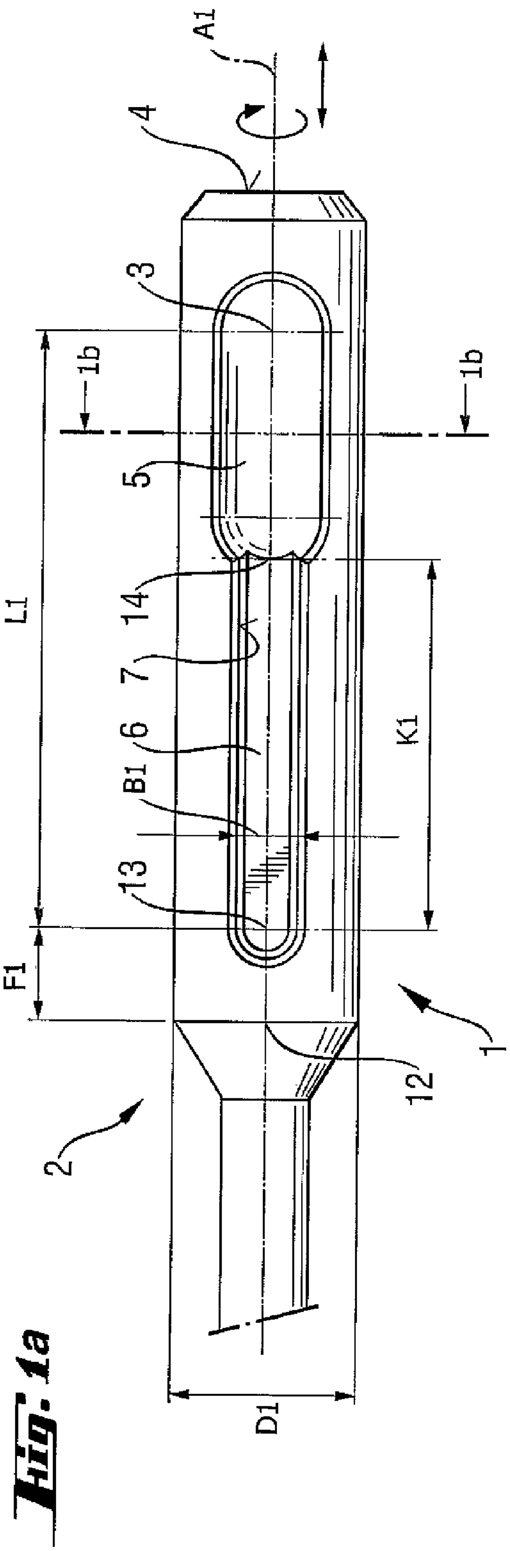

The invention relates to an insertion end for a rotary or percussively driven tool such as a chisel boring tool, chisel or a cutting core bit for working rock, concrete or masonry.

Conventionally a rotary or percussively driven tool has an insertion end extending longitudinally along an axis of a rotary or percussive hand tool machine. The interface between the insertion end of the tool and the tool holder of the hand tool machine must be compatible within a specific performance class to provide options for the use of a wide variety of tools. The internationally most widely used standardized insertion ends and associated tool holders, which are disclosed in DE2551125A1 and DE 3 716 915 A1,have a tool-side cylindrical sleeve-shaped guide surface oriented in the direction of the free leading end axially closed locking groove and towards the free leading end axially open trapezoidal rotary driving groove, wherein at least one radially displaceable locking element of the associated tool holder engages in a locking groove and can restrict the axial mobility of the tool in the tool holder.

The practically standardized insertion end and tool holder according to DE22551125A1 have a guide diameter of 10 mm, whereby each have precisely two identical, diametrically opposed locking grooves and rotary driving grooves, which are disposed symmetrically on the circumference. A guide surface, which does not contributed to torque transfer, extending up to the tool-side end of the insertion end communicates with the slightly longer rotary driving groove. These insertion ends were originally designed for a bit diameter of up to 17 mm and are consequently grouped in the range of the small, lower-power percussive drills with a power of less than 650 W. The increasingly higher output hand tool machines, in particular the percussion drilling machines such as hammer drills, however, make it possible to transmit high torques to the tool in certain operating modes. An extension of the practical range of application of these percussion drilling machines has resulted in a drill diameter of 30 mm. Furthermore, when removing the tool from the work piece, in particular in tools stuck in the bore hole, high torques are brought to bear on the tool by the user by virtue of the hand tool locking up. It has been shown, that the drill diameter of more than 17 mm has an increasing tendency to damage; for example, increasing the tendency of the insertion end to break in the zone of the locking groove and to be destroyed within the tool holder. These breakages are more bothersome when the broken end remains inside the percussion drill and can only be removed by dismantling the front part of the percussion drill from the tool holder. Even when there is no breakage when utilizing drills of greater drill diameters, there is a plastic deformation at the insertion end, which results in a disproportionately high wear on the tool holder.

The standardized insertion ends and tool holders disclosed in DE 3 716 915 A1 have a guide diameter of 18 mm, whereby precisely two identical, diametrically opposed locking grooves are present and exactly one rotary driving groove is arranged in one section half of these grooves and precisely two rotary driving grooves are symmetrically arranged in the other section half of these grooves. These insertion ends are designed for higher performance, larger percussion drills and the transmission of greater torques, whereby the problems mentioned in the above paragraphs occurs at higher power classes or torques. Tools with a guide diameter of 18 mm having a substantially smaller drill diameter of 14 mm, however, have poor impact pulse transmission. Furthermore, such disproportional tools are not economical to manufacture.

The resulting loads have the following composition: On the one hand, there is a loading of the insertion end by virtue of the percussive energy of the percussion drill; and on the other hand, there is, a torsion load emanating from the rotary wedges of the tool holder by virtue of the torque generated at the cutting edge. The torsion load transmits to the rotary driving slots of the insertion end. The torque loading is particularly high when there is a wedging of the cutting edge in a drilling reinforcement.

An additional load occurs when the user attempts to withdraw the percussion drill that is exerted by the locking element on the axial locking end of the locking groove and acts upon an at-risk, posterior cross-section of the locking groove. Many years of experience have shown that the cross-section situated in the zone of the axial locking end is especially at-risk by virtue of these combined, multiple-axis loads. The breakdown-mechanical is due to the locally pronounced, multiple-axis stress condition on the axial locking end, which effects a local stiffening via the transverse contraction. The transverse contraction represents a preferred fissure initiator and limits the fatigue strength of the alternately loaded insertion end.

According to DE 4 338 818, an insertion end of larger diameter is received in a tool holder. The tool holder can also receive an insertion end of smaller diameter. The tool holder has extra rotary driving grooves and locking grooves. The cross-section, which is reduced extremely in the axial region, has a poor impact pulse transmission and a low breaking strength, as already mentioned above.

SUMMARY OF THE INVENTION

The object of the invention is to provide an insertion end designed for damage-free transmission of high torque and optimum impact pulse transmission.

This object is achieved by the invention where an insertion end of a tool driven is provided at least partially rotational or percussively along an axis. The insertion end extends along the axis within a maximum guide diameter and has at least one axially closed locking groove at an axial locking end toward the free leading end and rotary driving grooves having a groove width having at least one tangential force contact surface, at least two rotary driving grooves, which have a length comprising at least three times the guide diameter, is arranged on the tool side in front of the axial locking end, and at least one contact length comprising at least 1.5 times the guide diameter.

The essential portion of the torque is, at least on the tool side, applied to the axial locking end by the rotary driving groove, which is arranged at least over an essential contact length on the tool side in front of the axial locking end. The breaking mechanically critical axial zone of the multiple-axis stress conditions at the axial locking end is thus exposed to lower stresses, whereby with given fatigue strength limits, a higher torque can be applied. In particular, higher torques can be applied at lower guide diameters with low-damage, whereby the impact pulse behavior is improved at lower drill diameters.

Advantageously, an axial guide length between a tool-side guide end with the guide diameter to a tool-side groove end of at least two rotary driving grooves is less than 1.5-times the guide diameter, whereby a torque can be applied in close proximity to the tool-side end of the insertion end.

Advantageously, the groove end of a tool-side locking end is offset axially on the tool-side by at least 1.5-times the guide diameter, whereby in this axial zone the cross-section is not attenuated by locking grooves, whereby the torsional strength is increased and higher torques can be applied with low wear.

Advantageously, the tangential contact surfaces run both parallel and perpendicular to the axis, at least over the contact length, whereby the surface normal is oriented tangential to the tangential contact surface and no shear forces favoring wear are induced upon application of the torque.

Advantageously, the radial groove depth of each rotary driving groove, at least over the contact length, is between 0.5 to 1.0 times the groove width, whereby high torques can be applied without substantial attenuation of the cross-section with adequate flexural strength of the rotary driving webs of the tool holder engaging in the rotary driving groove.

Advantageously, at least three rotary driving grooves are present, which are arranged symmetrically, whereby a higher torque can be applied.

Advantageously, two diametrically opposed locking grooves are present, whereby the insertion end can be introduced ergonomically advantageously in two orientations oriented at 180° into the tool holder.

Advantageously, the locking grooves transition on the tool-side into the rotary driving grooves, whereby the cross-section is less attenuated.

Alternatively, the rotary drive grooves on the tool-side are axially separated from the locking grooves, whereby the functional zones are separated from each other and accordingly can be easily manufactured.

Advantageously, the rotary driving grooves are circumferentially and symmetrically offset from the locking grooves, whereby there is more free space for the rotary driving means and the locking means in the associated tool holder.

Advantageously, the rotary driving grooves are open on the machine side, whereby the rotary driving means can be introduced from the frontal side of the insertion end into the rotary driving grooves.

BRIEF DESCRIPTION OF THE INVENTION

Figure 1B:
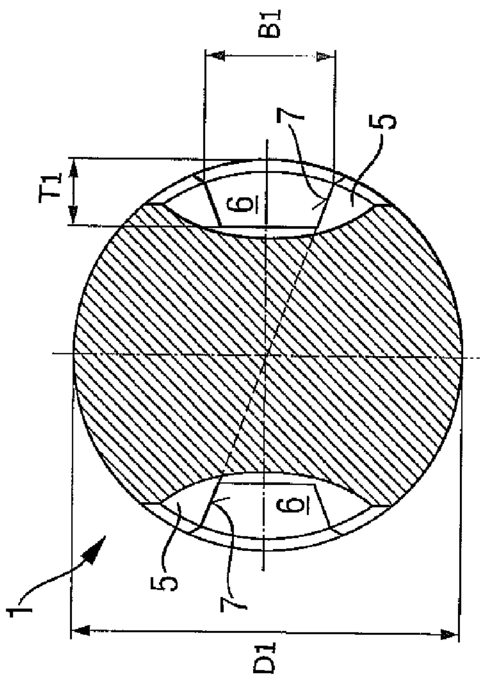

The preferred embodiment of the invention will be explained in more detail with reference to the drawings, wherein:

FIG. 1*a* represents a first embodiment of an insertion end according to the invention;

FIG. 1*b* represents an enlarged cross-section of the insertion end of FIG. 1*a* along lines 1*b*-1*b;*

Figure 2:
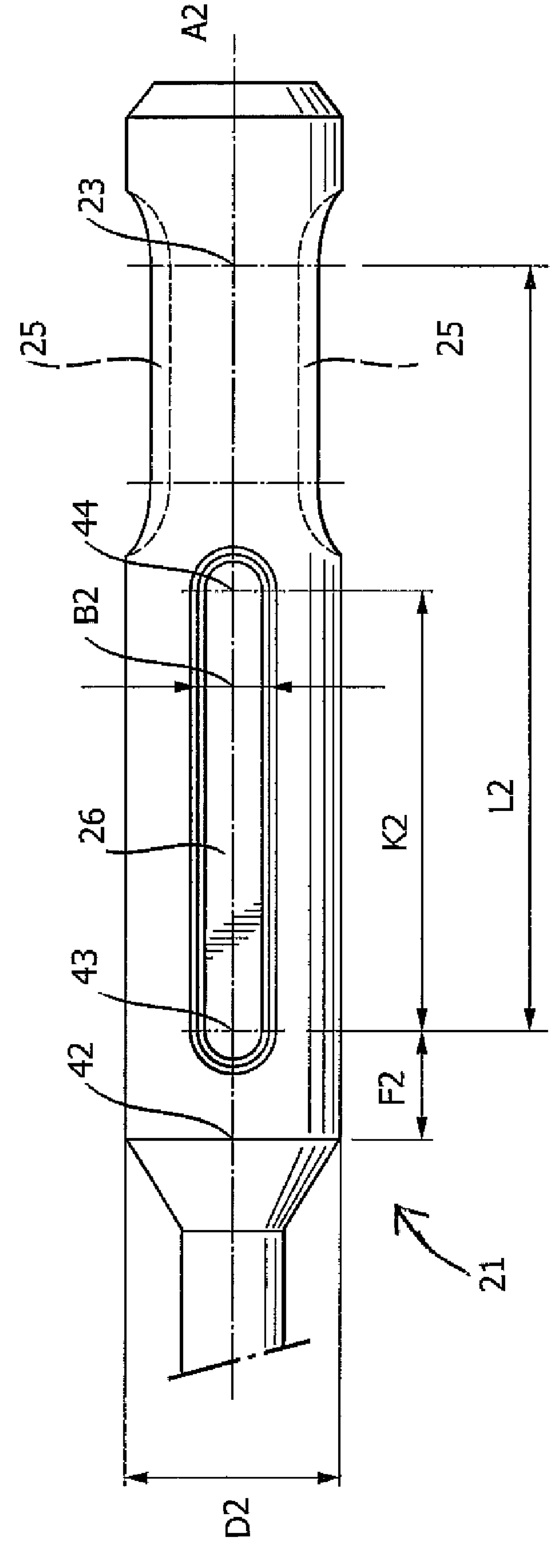

FIG. 2 represents a second embodiment providing a variant of the insertion end of FIG. 1*a;*

Figure 3A:
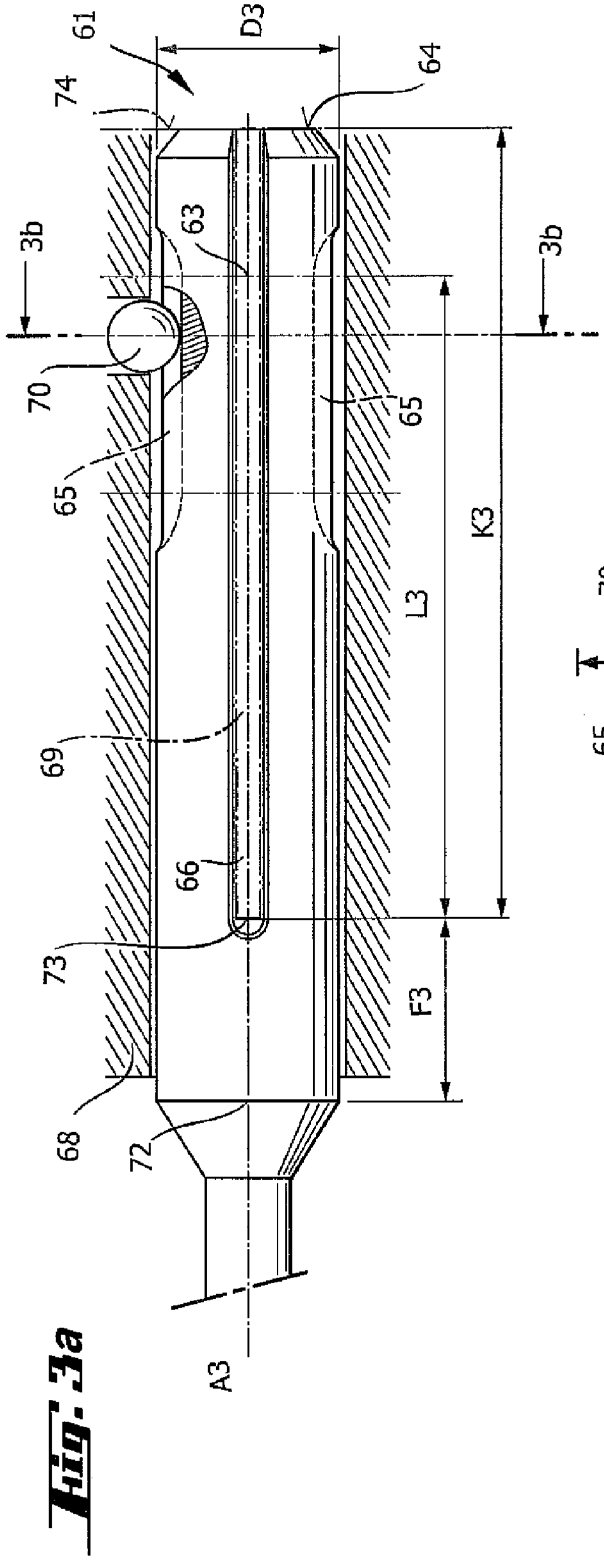
Figure 3B:
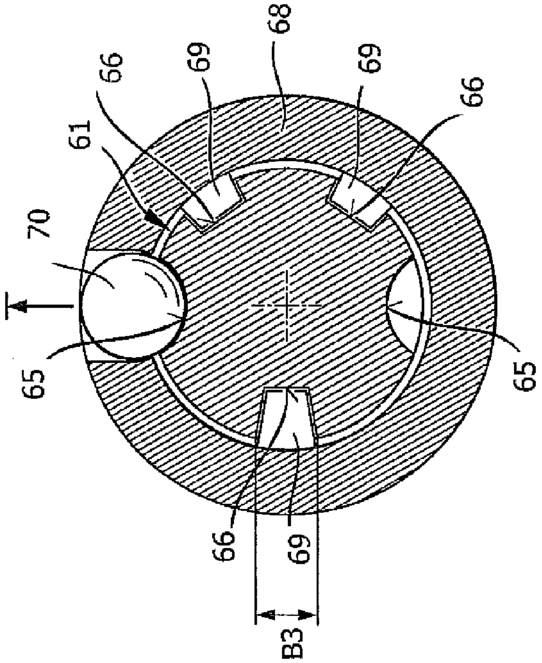

FIG. 3*a* represents a third embodiment providing another variant of the insertion end of FIG. 1*a*; and FIG. 3*b* represents an enlarged cross-section of the insertion end of FIG. 3*a* along lines 3*b*-3*b*.

DETAILED DESCRIPTION OF THE INVENTION

According to FIGS. 1*a* and 1*b*, a first embodiment of an insertion end 1 of a tool 2 is provided which is driven rotationally and percussively along an axis A1. The insertion end 1 extends longitudinally along the axis A having a maximum guide diameter D1 and has exactly two identical, diametrically arranged locking grooves 5. The insertion end 1 has exactly two identical, diametrically arranged rotary driven grooves 6 longitudinally closed at a longitudinal locking end 3 in the direction of the free leading end 4 with a tangential force contact surface 7 oriented in a direction having components which are parallel and perpendicular to the axis A1. A longitudinal guide length F equal to half of the guide diameter D1 is configured between a tool-side guide end 12 with the guide diameter D1 and a tool-side groove end 13 of both radially driving grooves 6. The groove end 13 is longitudinally offset from a tool-side locking end 14 by more than double the guide diameter D. A contact length K1, equal to double the guide diameter D1, extends along the contact surface of the insertion tool 1 with the contact surface contacting and engaging the driving mechanism of the tool 2, by which tangential pressure is effected to transmit torque to the insertion tool 1. The contact length K1 is measured from the center of curvature of the circular end of the rotary driving grooves 6 to the locking end 14. Over the contact length K1, both rotary driving grooves 6 are configured with a constant groove width B1 equal to one third of the guide diameter D1 and a length extending longitudinally, with the contact length K1 being less than or equal to a length L1. L1 is the combined length of a respective locking groove 5 and rotary driven groove 6 on either side of the insertion end 1. The length L1 is measured from the center of curvature of the circular end of the rotary driving grooves 6 to the center of curvature of the circular end of the locking grooves 5. The length L1 is greater than three times the guide diameter D1, and the rotary driving grooves 6 are arranged on the tool-side in front of the longitudinal locking end 3. The locking grooves 5 each transition on the tool side into the respective rotary driving grooves 6, whereby a respective radial groove depth T1 of each of the rotary driving grooves 6 is equal to half of the groove width B1 over the entire contact length K1.

According to a second embodiment of an insertion tool 21 shown in FIG. 2, the rotary driving groove 26, having a groove width B2 equal to one-third of the guide diameter D2, is longitudinally separated on the tool side from the two diametrically opposed locking grooves 25 and offset circumferentially by 90°. The contact length K2 extends along the contact surface of the insertion tool 21 with the contact surface contacting and engaging the driving mechanism of the tool, by which tangential pressure is effected to transmit torque to the insertion tool 21. The contact length K2 is measured from the center of curvature of the circular end of the rotary driving grooves 26 to the locking end 44. The length L2 is the combined length of a respective rotary driving groove 26 and a locking groove 25, and L2 is measured from the center of curvature of the circular end of the rotary driving grooves 26 to the center of curvature of the circular end of the locking grooves 25. The guide length F2 is half the guide diameter D2, the contact length K2 is equal to at least double the guide diameter D2, and the length L2 is equal to 3.5-times the guide diameter D2.

According to FIGS. 3*a* and 3*b* a third embodiment of a mirror-symmetrical insertion end 61 is introduced into an associated tool holder 68 having rotary driving means in three radially inwardly projecting rotary driving pockets 69 placed tool-side downstream, and a radially displaceable locking means in the form of a locking sphere 70. In addition, each of the rotary driving grooves 66 includes a constant groove width B3, which is one fifth of the guide diameter D3. The rotary driving grooves 66 are open on the machine side up to the free front end 64. The three mirror-symmetrically arranged rotary driving grooves 66 are symmetrically and circumferentially offset from the two diametrically opposed locking grooves 65.

The contact length K3 extends along the contact surface of the insertion tool 61 with the contact surface contacting and engaging the driving mechanism of the tool, by which tangential pressure is effected to transmit torque to the insertion tool 61. The contact length K3 is measured from the center of curvature of the circular end of the rotary driving grooves 66 to the locking end 74. The length L3 is measured from the center of curvature of the circular end of the rotary driving grooves 66 to the center of curvature of the circular end of the locking grooves 65. The guide length F3 is equal to the guide diameter D3, the contact length K3 is equal to 4-times the guide diameter D3, and the length L3 is equal to 3.5-times the guide diameter D3, whereby the groove end 73 of the tool-side locking end 74 is offset longitudinally on the tool side by a distance of double the guide diameter D3.

What is claimed is:

1. An insertion end of a tool driven along an axis in at least one of partially rotary movement and percussive movement, the insertion end comprising:

a longitudinally extending member having:

a longitudinal axis;

a maximum guide diameter;

at least one locking groove longitudinally closed at a locking end towards a free leading end; and at least one rotary driving groove having at least one tangential force contact surface;

wherein the at least one rotary driving groove is arranged on the tool-side ahead of the locking end; and wherein the at least one rotary driving groove has a width equal to at least one fifth of the guide diameter;

wherein a combined length of the at least one rotary driving groove and the at least one locking groove is equal to at least three times the guide diameter;

wherein a contact length of the at least one rotary driving groove is equal to at least 1.5 times the guide diameter.

2. The insertion end of claim 1, wherein the longitudinally extending member includes:

a tool-side guide end; and a tool-side groove end of the at least one rotary driving groove;

wherein a guide length extending between the tool-side guide end and the tool-side groove end is less than 1.5 times the guide diameter.

3. The insertion end of claim 2, wherein the longitudinally extending member includes:

a tool-side locking end of the at least one locking groove;

wherein a guide length extending longitudinally from the tool-side groove end to the tool-side locking end is at least 1.5 times the guide diameter.

4. The insertion end of claim 3, wherein the at least one rotary driving groove includes the tangential force contact surface oriented in a direction having components which are parallel and perpendicular to the longitudinal axis.

5. The insertion end of claim 1, wherein each rotary driving groove includes:

a groove width; and a radial groove depth radially oriented from the longitudinal axis;

wherein the radial groove depth of each rotary driving groove is between 0.5 to 1.0 times the groove width.

6. The insertion end of claim 1, wherein the at least one rotary driving grooves include:

at least three rotary driving grooves are arranged mirror-symmetrically about the longitudinal axis.

7. The insertion end of claim 1, wherein at least one locking groove includes two locking grooves diametrically spaced about the longitudinal axis.

8. The insertion end of claim 7, wherein the at least one locking groove transitions on the tool-side into the at least one rotating driving groove.

9. The insertion end of claim 1, wherein the at least one rotary driving groove is longitudinally axially spaced separate from the at least one locking groove.

10. The insertion end of claim 1, wherein at least one rotary driving groove is circumferentially offset about longitudinal axis apart from the at least one locking groove.

11. The insertion end of claim 1, wherein the at least one rotary driving groove is open on the tool side.

12. The insertion end of claim 1, wherein the at least one rotary driving groove is symmetrically offset from the at least one locking groove.

* * * * *